United States Patent Office 3,270,644
Patented Sept. 6, 1966

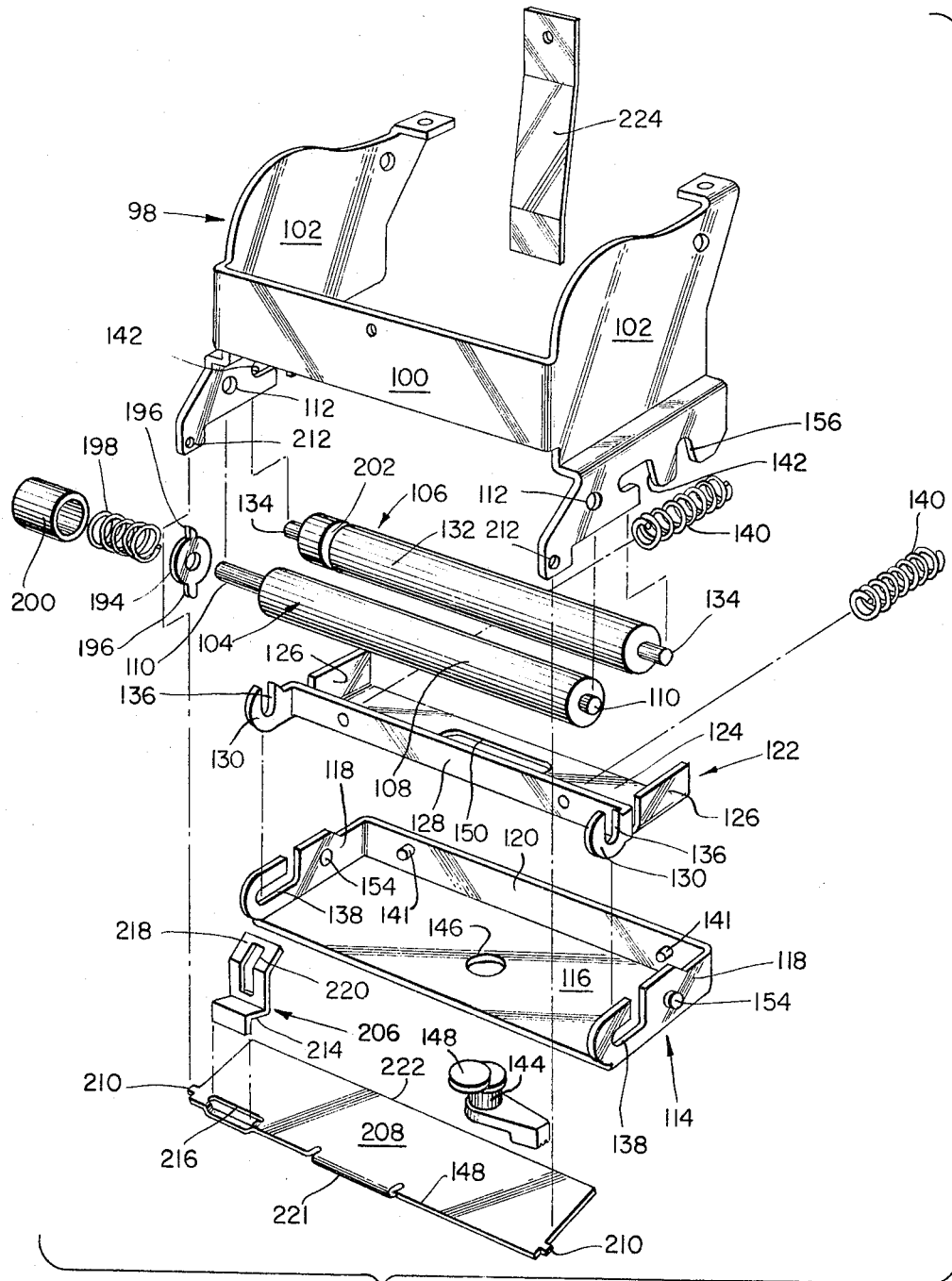

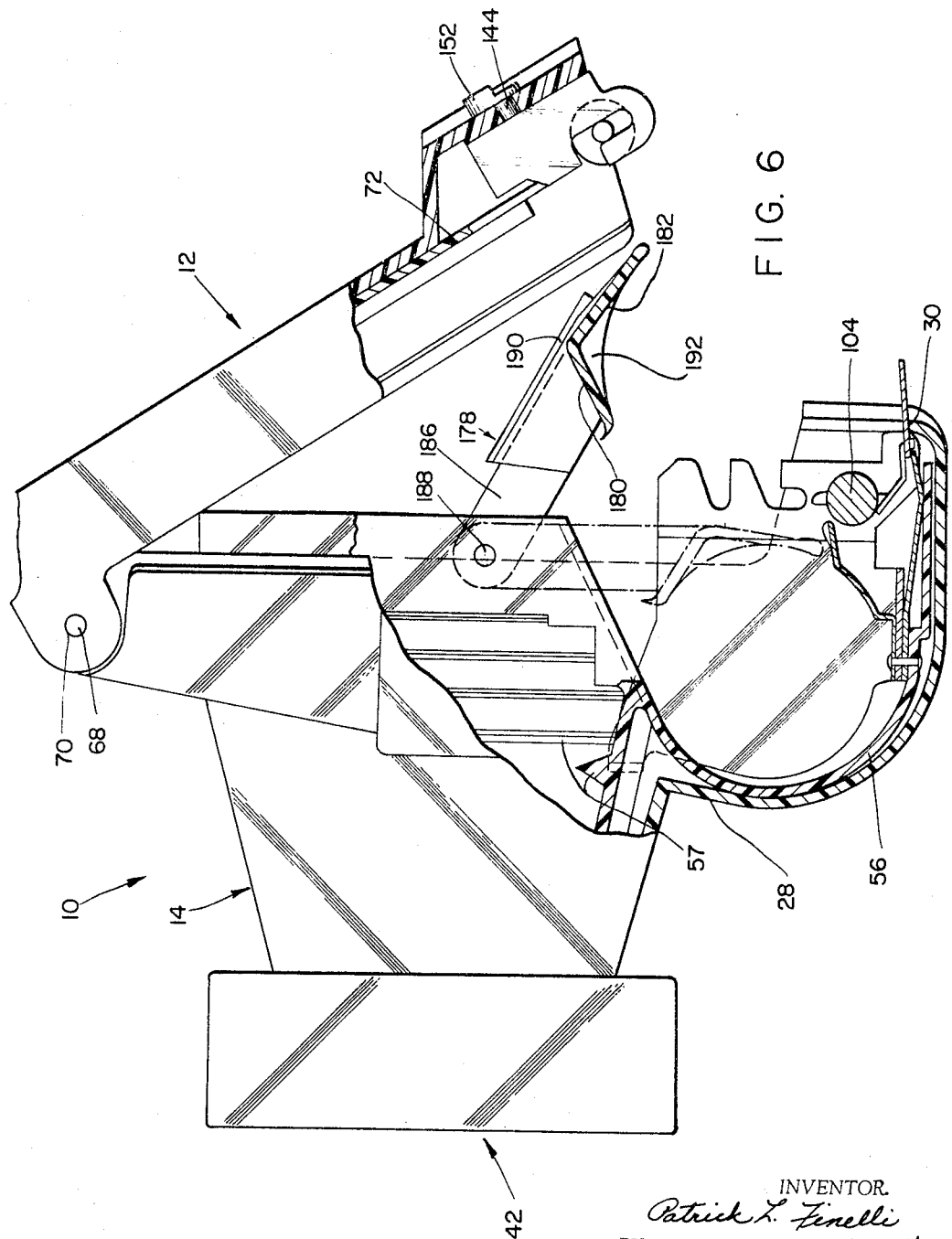

3,270,644
CAMERA STRUCTURE
Patrick L. Finelli, Sudbury, Mass., assignor to Polaroid Corporation, Cambridge, Mass., a corporation of Delaware
Filed July 16, 1964, Ser. No. 383,197
5 Claims. (Cl. 95—13)

This invention relates to photographic apparatus and particularly to cameras for exposing and processing successive areas of a photosensitive sheet.

Cameras of the type with which the present invention is concerned generally comprise means for exposing successive areas of a photosensitive image-recording sheet, superposing each exposed area with an area of a second sheet and distributing a processing liquid between the superposed sheets; and include means for storing separately coils of image-recording and second sheets, positioning successive areas of the image-recording sheet for exposure, guiding the sheets into superposition, pressing the sheets together and distributing the processing liquid, and controlling movement of the sheets through the camera. The particular type of camera embodying the invention includes a housing comprising two sections movable with respect to one another to permit loading and an opening in the housing through which the superposed sheets are withdrawn from between a pair of pressure-applying members comprising the means for distributing the processing liquid between the sheets. The housing sections are preferably designed to provide for so-called "drop in" loading in which the separate coils of photosensitive and second sheets are dropped into recesses which hold and properly position them when the camera housing sections are closed.

Objects of the invention are: to provide, in a camera of the type described including two relatively movable housing sections defining an opening through which sheet materials are withdrawn, novel and improved means for holding a coil of a sheet and preventing exposure of a photosensitive sheet by light admitted through the opening; and to provide means as described, designed to support successive portions of the photosensitive sheet in position for exposure and guide the successive portions of the photosensitive sheet into superposition with a second sheet.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 5 is an exploded perspective view of components of the camera; and

FIG. 6 is a view, similar to FIG. 3, showing another embodiment of the camera.

Figure 1:
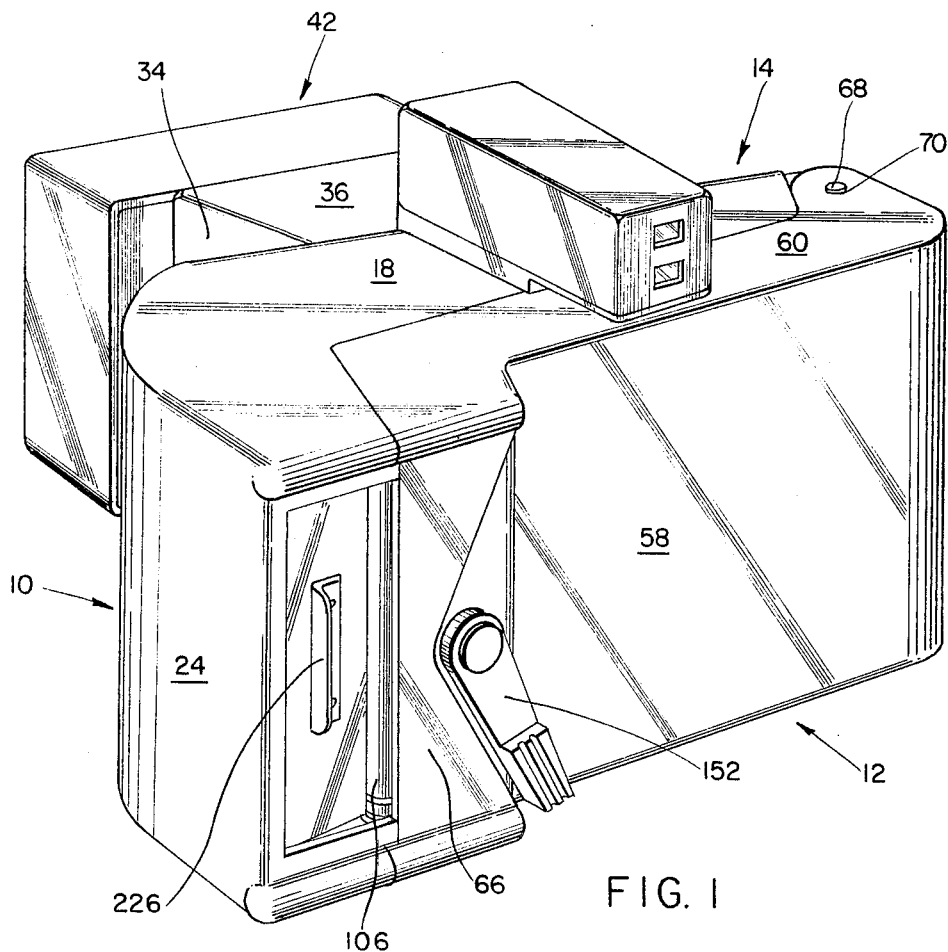
FIGURE 1 is a rear perspective view of a camera embodying the invention.
Figure 2:
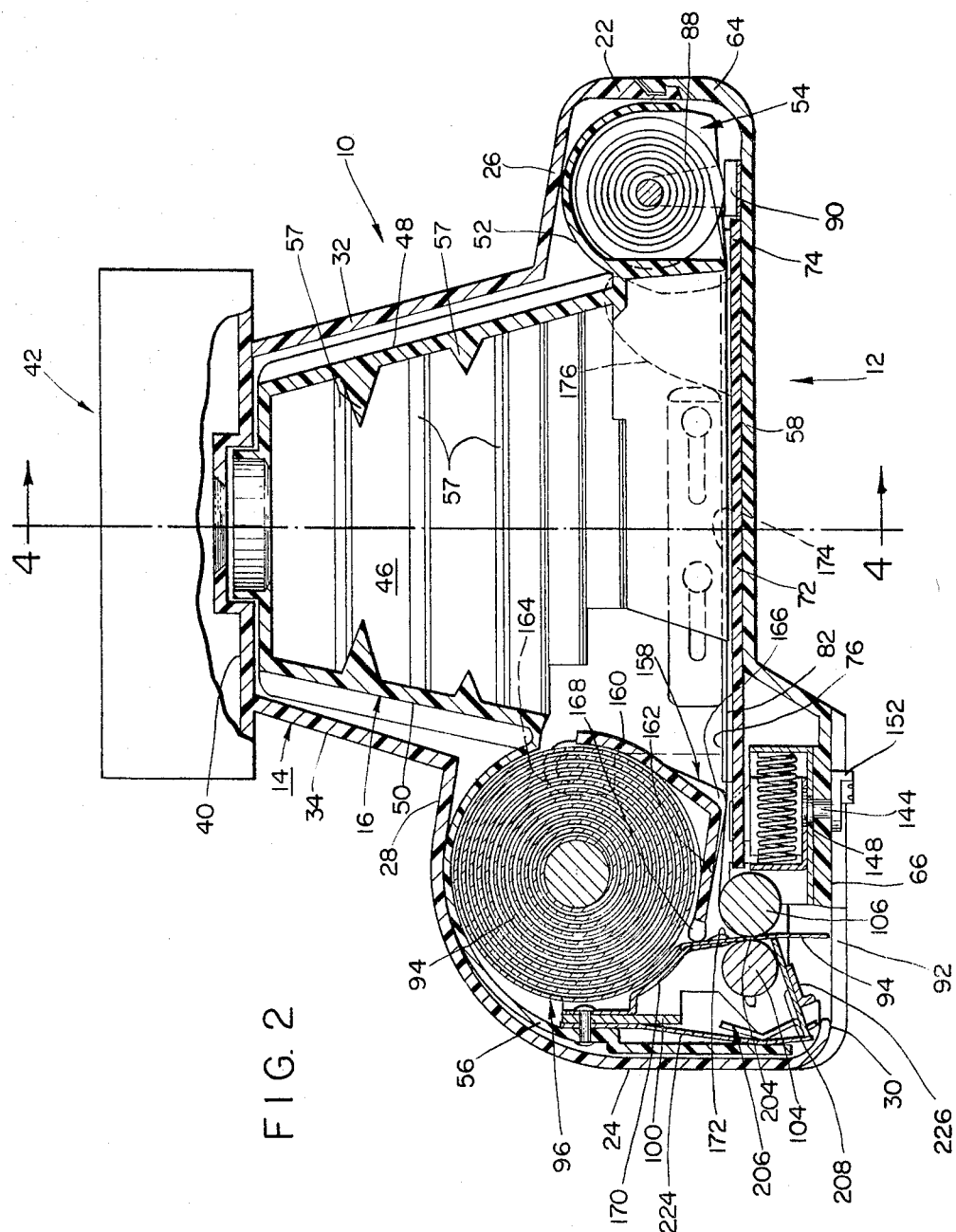
FIG. 2 is a sectional view of the camera of FIGURE 1 taken substantially midway between the top and bottom of the camera.

The camera of the invention is of the so-called "Polaroid Land" type designed to employ a film assemblage of the type shown and described in U.S. Patent No. 2,579,587, and comprising a photosensitive image-recording sheet of a length sufficient for a plurality of exposures, e.g., eight, a second or image-receiving sheet approximately equal in length to the image-recording sheet and coupled at its leading end with the leading end of the image-recording sheet and to a leader, and a succession of rupturable containers of processing liquid mounted on the second sheet in spaced relation, one container being provided for each area of the photosensitive sheet to be exposed and processed. The photosensitive and second sheets are both coiled, the former being coiled on a spool and the latter being coiled loosely in a substantially larger coil. The camera is adapted to hold the coils of photosensitive and second sheets apart from one another, guide successive areas of the photosensitive sheet into position for exposure, expose the areas, guide the exposed areas into superposition with successive portions of the second sheet and apply compressive pressure to each exposed area and portion of the sheets and the associated container of processing liquid for distributing the liquid from the container between the sheets to form a sandwich in which a positive image is produced on the image-receiving sheet by a diffusion transfer reversal process. The film assemblage differs essentially from the film assemblage described in the aforementioned patent in that photosensitive and image-recording sheets are opaque to light actinic to the photosensitive sheet, permitting the sandwich comprising an exposed area of the photosensitive sheet and a portion of the image-receiving sheet adhered thereto by the processing liquid, to be withdrawn directly from the camera into the light where the two sheets are maintained in superposition for a period of predetermined duration at the end of which the sheets are separated to reveal the finished print.

Reference is now made to FIGS. 1 through 4 wherein the camera of the invention is shown as comprising a two-section housing including a forward housing section 10 and a rear housing section 12, coupled with one another for pivotal movement with respect to one another between a closed or operative position (shown in FIGS. 1 and 2), and an open position (shown in FIG. 3), to permit loading of a film assemblage into the housing. Both housing sections are designed for manufacture from inexpensive materials, specifically organic plastics, by conventional mass production processes such as injection molding and vacuum forming. The forward housing section includes an outer housing 14 and an inner liner 16 engaged within the outer housing. This arrangement is desirable because it permits the outer housing to be designed and fabricated with a view to aesthetic as well as functional considerations. For example, the outer housing may be formed of a light colored organic plastic material which is aesthetically desirable, but may not have sufficient opacity for photographic purposes, or is translucent. The inner liner is formed of plastic material which may be less pleasing aesthetically, but is opaque to actinic light, preferably dull black, and performs the additional function, in cooperation with the outer housing, of providing space between the outer housing and the inner liner for enclosing various components of the camera mechanism.

The outer housing of the forward housing section comprises a body section open at the rear and including an upper wall 18, lower wall 20 and end walls 22 and 24 joined with, respectively, forward walls 26 and 28; a relatively short rear wall 30 comprising an extension of end wall 24; and a forward portion generally in the form of a pyramid having convergent side walls 32 and 34 extending forwardly from forward walls 26 and 28 respectively, and convergent upper and lower walls 36 and 38 extending forwardly from, respectively, upper wall 18 and lower wall 20. It should be understood that in connection with the description of the camera, expressions such as "upper," "lower" and "side" are employed for the purposes of description and not in a limiting sense or to indicate the position in which the camera is employed. The forward portion of the outer housing of the forward housing section includes a forward wall 40 joined with side walls 32 and 34, upper wall 36 and lower wall 38 for mounting a lens and shutter assembly 42.

The inner liner 16 for the forward housing section comprises an upper wall 44 disposed adjacent upper walls 18 and 36; a lower wall 46 disposed adjacent lower walls 20 and 38; converging side walls 48 and 50 disposed within the forward portion of the outer housing adjacent, respectively, side walls 32 and 34; a U-shaped wall 52 at one end adjacent end wall 22 and forward wall 26 and cooperating with upper and lower walls 44 and 46 to provide a recess or chamber 54 for receiving and holding a length of a photo-sensitive image-recording sheet coiled on a spool; and a J-shaped wall 56 including a curved forward portion underlying forward wall 28 and an end portion underlying end wall 24 adapted to cooperate with means, to be described hereinafter, to provide a recess for holding a coil of the second or image-receiving sheet. Lower wall 46 may, as shown, comprise a separate, removable component cooperating with lower wall 38 to define a chamber 51 for containing components, such as a battery, of the camera. The inner liner provides three recesses or chambers, to wit, first and second chambers at opposite ends of the housing for holding the photosensitive and image-receiving sheets and a third or medial chamber within the forward portion of the forward housing section providing a light path between the lens and shutter assembly and the rear of the camera housing within which successive areas of the photosensitive sheet are positioned for exposure. The portions of upper and lower walls 44 and 46 and side walls 48 and 50 defining the third chamber enclosed by convergent side walls 32 and 34 and upper and lower walls 36 and 38 are provided with inwardly projecting ribs 57 which function as light baffles to prevent reflections within the third chamber.

Rear housing section 12 comprises a rear wall 58, dependent upper and lower walls 60 and 62, and an end wall 64. Rear wall 58 is, for the most part, substantially rectangular and planar and includes an end portion 66 at the end of the rear wall opposite end wall 64 which is disposed rearwardly from the aforementioned planar portion of the rear wall and cooperates with upper and lower walls 60 and 62 to provide a recess in the rear housing section. As a means for pivotally mounting rear housing section 12 on forward housing section 10, upper and lower walls 36 and 38 of inner liner 16 are formed with studs 68 engaged in holes 70 formed in upper and lower walls 60 and 62 of rear housing section 12 adjacent end wall 64 of the rear housing section. For this purpose and to provide a light-tight housing, upper and lower walls 60 and 62 extend forwardly outside of upper and lower walls 44 and 46 of inner liner 16 and overlap edge portions of upper and lower walls 18 and 20 of forward housing section 10. The overlapping portions of upper and lower walls 60 and 62 and upper and lower walls 18 and 20 are formed with interlocking ribs and channels which cooperate to provide a light seal and properly position the forward and rear housing sections with respect to one another when in the closed position. End wall 64 of the rear housing section also overlaps end wall 22 of the forward housing section and the overlapping portions of the two end walls are also provided with interlocking ribs and channels to facilitate light-sealing the camera housing.

The rear housing section includes an inner panel 72 secured to the inside of rear wall 58 and formed of a light opaque material, preferably an organic plastic, for the purpose of preventing admission of light into the housing through the rear wall which, as previously noted, may be formed of an organic plastic which is translucent and cooperating to position successive areas of a photosensitive image-recording sheet in position for exposure. Inner liner 16, and specifically, upper and lower walls 18 and 20 thereof, is provided with tracks 74 located at the rear of the housing substantially at the focal surface of the lens of assembly 42 for engaging the lateral marginal portions of a photosensitive sheet to support the photosensitive sheet at the focal surface of the lens. In the closed position of the camera housing, inner panel 72 bears against the rear surface of the image-recording sheet to support the sheet against tracks 74 in position for exposure. As a means for guiding the image-recording sheet along a proper path across tracks 74 and light seal the portion of the camera housing in which the photosensitive sheet is exposed, inner panel 72 is provided at its upper and lower edges with forwardly projecting flanges 76 which extend rearwardly adjacent and outside of tracks 74.

As previously noted, U-shaped wall 52 and upper and lower walls 44 and 46 of inner liner 16 cooperate to form a first recess or chamber, designated 54, at one end of the camera housing for holding a coil of photosensitive image-recording sheet, designated 82. The coil of image-recording sheet 82 is mounted on a spool or similar means including end discs 84 and a shaft 86 having ends projecting beyond discs 84. Upper and lower walls 44 and 46 within chamber 54 are formed with channels 88 for receiving the ends of shaft 86, and a spring 90 is provided on the inside of inner panel 72 within chamber 54 for frictionally engaging end discs 84 to inhibit rotation of the end discs and uncoiling of the image-recording sheet and thereby maintain the image-recording sheet under tension as it is withdrawn from chamber 54.

Rear wall 30 of the forward housing section and rear wall 58 of the rear housing section include adjacent portions cooperating to provide an opening 92 at the rear of the camera housing near the end thereof opposite chamber 54 through which the image-recording sheet may be withdrawn in superposition with a second or image-receiving sheet, designated 94. As previously noted, portions of inner liner 16, including upper and lower walls 36 and 38, and J-shaped wall 56 cooperate to provide a second chamber or recess, designated 96, at the end of the camera housing opposite chamber 54 for containing a coil of second sheet 94.

The camera includes a device for superposing the photosensitive and image-receiving sheets and distributing processing liquid from successive containers between successive areas of the two sheets; controlling movement of the sheets through the apparatus to position successive areas of the image-recording sheet for exposure; retaining the forward and rear housing sections in closed position; and severing successive portions of the superposed sheets from the remainder of the sheets as the portions are withdrawn from the camera housing through opening 92. This device is of the type described in the copending U.S. patent application of Vaito K. Eloranta, Serial No. 358,269, filed April 8, 1964, now abandoned, and, as noted, performs most of the operative functions of the camera with the main exception of exposing the photosensitive image-recording sheet. The device comprises a U-shaped frame 98 mounted within recess 96 on the end portion of J-shaped wall 56. Frame 98 includes a transverse member 100 located adjacent the end portion of J-shaped member 56 and a pair of side members 102 located adjacent upper and lower walls 44 and 46. The means for superposing the sheets and distributing a processing liquid therebetween comprise a pair of rolls 104 and 106 mounted on, respectively, the forward and rear housing sections. Roll 104 includes a generally cylindrical medial portion 108 for engaging and applying compressive pressure to the medial portions of the sheets and shafts 110 at its ends journaled in holes 112 in side members 102.

Means are provided for mounting roll 106 in juxtaposition with roll 104 when the housing sections are in closed position and biasing roll 106 toward roll 104 to apply compressive pressure to the sheets during movement of the sheets relative to and between the rolls. These means include a frame 114 including a base 116, upstanding side members 118 and an upstanding side member 120 extending between and connecting side members 118. Frame 114 is mounted with base 116 against end portion 66 of rear wall 58, side members 118 located adjacent upper and lower walls 60 and 62 of rear housing section 12, the side members and transverse member extending forwardly within the camera housing. Roll 106 is mounted on a carrier 122 in turn mounted on frame 114, and including an elongated base 124 with upstanding end members 126 at its ends, a transverse member 128 upstanding from one longitudinal edge of base 124, and brackets 130 extending from the ends of transverse member 128 in opposite directions from end members 126 and in planes substantially parallel therewith. Frames 98 and 114 and carrier 122 are each designed to be fabricated of pressed metal from a single sheet-metal blank, and cooperate with one another to absorb substantially all of the forces exerted by and upon rolls 104 and 106, the indexing mechanism for controlling the movement of the sheets, latch means for retaining the housing sections in closed position and means for severing successive portions of the sheets as they are withdrawn from the camera housing.

Roll 106 includes a generally cylindrical medial portion 132 cooperating with medial portion 108 of roll 104 for engaging and applying compressive pressure to the medial portions of the sheets, and shafts 134 at its ends on which the roll is mounted for rotation on carrier 122 and frame 114. Shafts 134 are journaled in slots 136 in brackets 130, the slots being open at their forward ends to permit assembly of the mechanism; and in L-shaped slots 138 in side members 118 of frame 114. L-shaped slots 138 are open at their forward ends and extend rearwardly and then at right angles toward the end of the camera housing and roll 104, thereby providing for limited movement of roll 106 toward and away from roll 104 with the axes of the rolls lying in substantially the same plane. Carrier 122 is engaged between side members 118 of frame 114 for sliding movement together with roll 106 toward and away from roll 104 and is biased by springs 140 engaged between transverse member 120 of frame 114 and transverse member 128 of carrier 122 around studs 141 mounted on the transverse members. Engagement of shafts 134 in L-shaped slot 138, specifically the portions of the slots extending parallel with the direction of movement of carrier 122 with respect to frame 114, is effective to retain frame 114, carrier 122, roll 106 and springs 140 together as a unitary assembly which is mounted on the rear housing section between end portion 66 of rear wall 58 and an end portion of inner panel 72 which extends to a position adjacent roll 106.

Side members 102 of frame 98 extend rearwardly, in the closed position of the camera housing sections, outside of side members 118 of frame 114 and include L-shaped slots 142, opening rearwardly in alignment with L-shaped slots 138 and including end portions overlying the end portions of L-shaped slots 138 in the closed position of the camera housing sections. L-shaped slots 142 in side members 102 comprise components of a latching mechanism for releasably retaining the housing sections in closed position which includes a shaft 144 extending from the outside of the camera housing through an opening in end portion 66 of rear wall 58, engaged for rotation in a hole 146 in base 116 of frame 114 and having mounted on its inner end, a cam 148 engaged for rotation in an elongated hole 150 in base 124 of carrier 122. A manually engageable lever 152 is attached to the outer end of shaft 144 for rotating the cam to move carrier 122 relative to frame 114 and roll 104 against the bias of springs 140. In this manner shafts 134 of roll 106 may be moved toward and away from roll 104 within the confines of the end portions of L-shaped slots 138 in frame 114. In the open or inoperative position of the camera, shaft 144 and cam 148 are rotated so that roll 106 and carrier 122 are displaced against the bias of springs 140 toward transverse member 120 of frame 114. In this position of roll 106, shafts 134 are aligned with the open ends of L-shaped slots 142 in side members 102 of frame 98 on the forward housing section and become engaged in L-shaped slots 142 when the rear housing section is pivoted, with respect to the forward housing section, into closed position. Shaft 144 and cam 148 are then rotated to allow carrier 122 and roll 106 to move under the bias of springs 140 toward roll 104 so that shafts 134 become engaged within the dead end portions of L-shaped slots 142 effectively retaining the camera housing sections in closed position.

Means are provided for properly locating frame 114, and its associated carrier 122 and roll 106 mounted thereon, with respect to frame 98 and roll 104, and for absorbing the forces exerted on frames 98 and 114 by way of rolls 104 and 106 so that the forces exerted by and upon the rolls are not transferred to the camera housing. These means include a pair of studs 154 projecting outwardly from side members 118 of frame 114 for engagement in U-shaped slots 156 in side members 102 of frame 98 when the housing sections are in closed position. Slots 156 and the open end portions of L-shaped slots 142 face the rear of the camera and are defined by inclined edges at the sides of the slots furthest from roll 104 so that the slots are divergent and the inclined edges function to insure engagement of shafts 134 and studs 154 in, respectively, slots 142 and 156 during pivotal movement of the housing sections into closed position.

The camera is employed with a coil of photosensitive image-recording sheet 82 extending from chamber 54 between the rear edge of U-shaped wall 52 into the aforementioned medial chamber in which an area of photosensitive sheet is positioned for exposure on tracks 74 between the latter and inner panel 72 at the rear of the third chamber. From this third chamber, the image-recording sheet extends into second chamber 96 around roll 106 between the latter and roll 104 and from the camera through opening 92. Second or image-receiving sheet 95 extends from a coil within chamber 96 into superposition with the image-recording sheet between rolls 104 and 106 from the camera housing through opening 92. In accordance with the invention, means are provided for separating chamber 96 from the third or medial chamber so as to prevent light, entering opening 92, from exposing the side of the image-recording sheet which is photosensitive; and for performing the additional functions of supporting a portion of the image-recording sheet positioned for exposure; retaining a coil of the image-receiving sheet in proper position within chamber 96; and guiding the image-recording sheet into superposition with the image-receiving sheet so that the two sheets are properly aligned with one another and with respect to rolls 104 and 106 during movement between the rolls from the camera. These means comprise a support and barrier member, designated 158, mounted within and on the forward housing section for pivotal movement with respect to the forward housing section between an operative position, shown in FIG. 2; and an inoperative position, shown in FIG. 3, when the camera housing sections are in open position to permit loading of a coil of second sheet 94 into chamber 96. Support and barrier member 158, in the form shown in FIGS. 2 and 3, comprises a generally L-shaped panel having a first section 160 extending, in the operative position of member 158, from the juncture of side wall 50 and J-shaped wall 56 of inner liner 16 rearwardly so as to provide substantially an extension of side wall 50 separating the second and third chambers; and a second section 162 extending at an angle with respect to the first section toward end wall 24 of the camera housing to a position closely adjacent roll 106 and terminating just short of a plane tangent to both rolls. The L-shaped panel comprising first and second sections 160 and 162 extends substantially from upper wall 44 to lower wall 46 of inner liner 16 so as to prevent light from being admitted from chamber 96 between the end edges of the panel and the upper and lower walls into the third chamber. Section 160 of member 158 is formed at opposite ends with dependent arms 164 at which member 158 is pivotally mounted on studs provided on side members 102 of frame 98. The barrier member, like the inner liner, is adapted to be formed of a light opaque organic plastic material and includes ribs 166 projecting rearwardly from second section 162 and function as extensions of tracks 74 for engaging the lateral edges of the image-recording sheet to support an end portion of the area of the image-recording sheet to be exposed, in position for exposure, the exposure system being designed to expose an area of the image-recording sheet extending from U-shaped wall 52 substantially to the juncture of first and second sections 160 and 162 of support member 158. The barrier member also includes projections 168 extending beyond the end of second section 162 past the aforementioned plane tangent to both rolls, for engaging the lateral edges of the image-receiving sheet to guide the image-receiving sheet into alignment with the image-recording sheet between the rolls and from the camera housing. Inner panel 72, as previously noted, extends to a point closely adjacent roll 106 and also cooperates to support the end portion of an area of image-recording sheet in position for exposure.

Additional means are provided within chamber 96 for preventing light from entering the chamber past rolls 104 and 106 and, in the form shown, comprise a cover panel 170 mounted adjacent one edge on transverse member 100 of frame 98 extending from top to bottom of chamber 96 and to a position closely adjacent roll 104 near the bite of the rolls so as to prevent light from entering opening 92 and passing between roll 104 and J-shaped wall 56 into chamber 96. Cover panel 170 also functions to prevent the processing liquid from leaking from between the lateral edges of the superposed sheets as the liquid is distributed between the sheets during movement through the pressure-applying rolls, and for this purpose is provided with lateral projections which engage the lateral margins of the image-receiving sheet and deform the sheets out of a plane tangent to the rolls, just in front of the bite of the rolls thereby pressing the margins of the sheets together.

Figure 3:
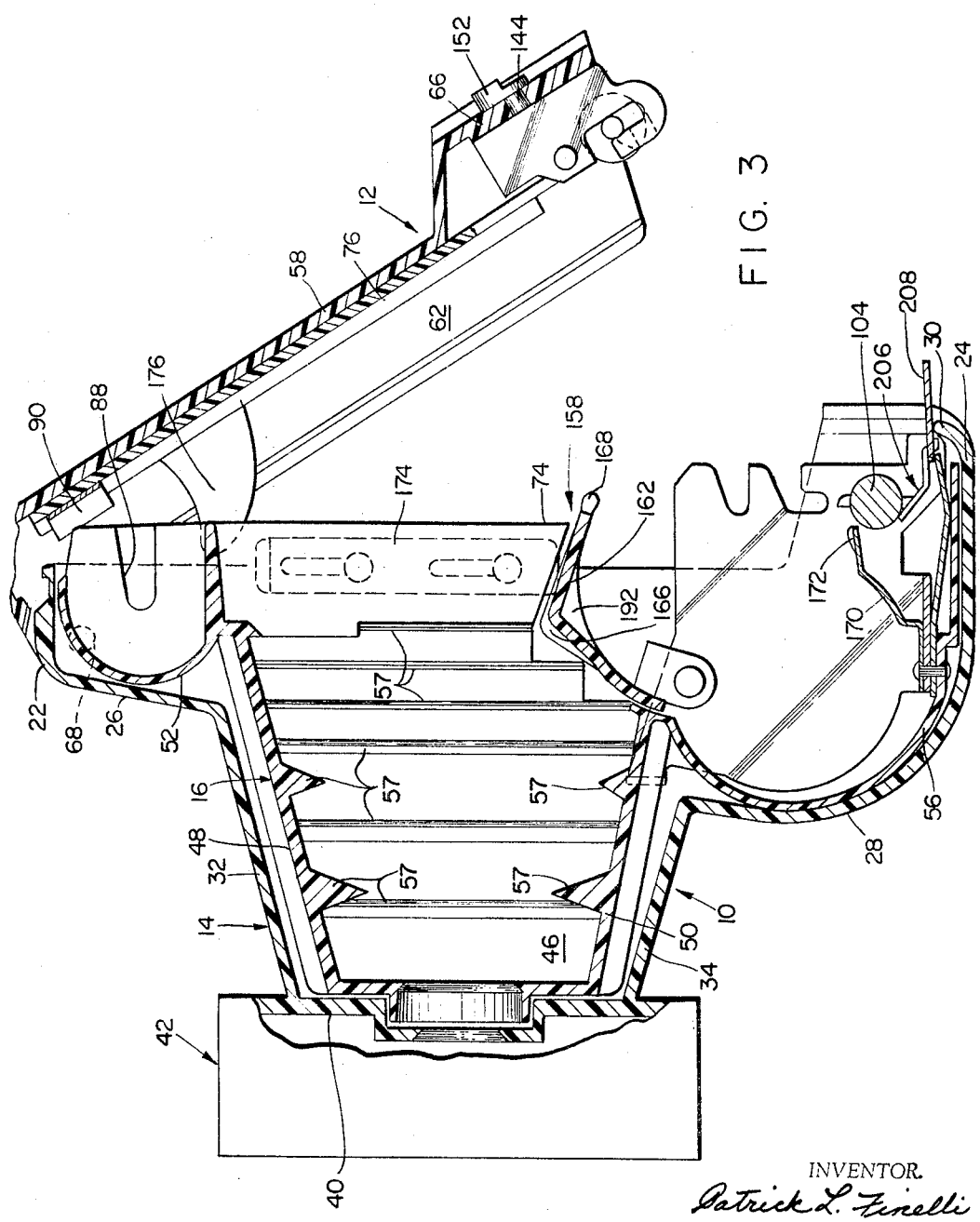
FIG. 3 is a fragmentary perspective view similar to FIG. 2 showing the camera with the housing thereof in an open position.
Figure 4:
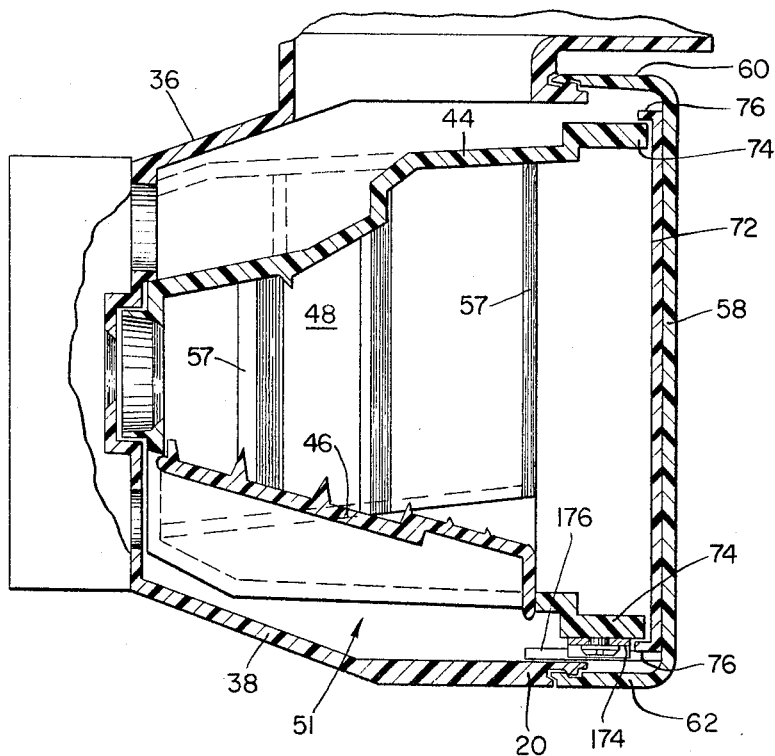
FIG. 4 is a sectional view taken substantially along the line 4—4 of FIG. 2.

Support and barrier member 158 is necessarily pivotable to the open position, shown in FIG. 3, in order to permit loading of a coil of the image-receiving sheet into recess 96 preferably so that, in the open or inoperative position of the camera housing, the camera may be loaded by dropping the roll of image-receiving sheet into recess 54 and the coil of the image-recording sheet into recess 96 with the connecting leader extending from the roll of image-recording sheet across the rear of the forward housing section and member 158 to a location adjacent roll 104 and thence rearwardly past roll 104 and rear wall 30. The rear housing section is then pivoted to a closed or operative position automatically threading the leader between rolls 104 and 106 and pivoting member 158 into its closed or operative position. In the preferred embodiment, resilient means are provided for biasing member 158 into its open position and means are provided for automatically pivoting member 158 into operative position when the housing sections are closed. These means may be mounted on the forward housing section for engagement by means on the rear housing section for pivoting member 158 from its open position at least part way into its closed position during pivotal movement of the rear housing section relative to the forward housing section into closed position; and, in the form shown, include a slotted push rod 174 slidably mounted on the side of one of tracks 74 between the track and either upper wall 60 or lower wall 62 for lengthwise movement relative to the camera housing in a direction parallel with the rear wall of the camera housing; and a cam 176 mounted on the rear housing section for engaging the end of push rod 174 opposite member 158 during movement of the rear housing section into closed position to move the push rod lengthwise toward and into engagement with member 158 to pivot member 158 from its fully open position part way into its closed position to a position in which inner liner 72 will engage member 158 to pivot it into its fully closed or operative position. In an alternative embodiment, cams may be provided on the rear housing section for directly engaging and pivoting member 158 into operative position.

In another embodiment of the invention, shown in FIG. 6, the means for separating the chambers, guiding the image-recording sheet, etc., comprise a generally V-shaped panel 178 having first and second sections 180 and 182 similar to first and second sections 160 and 162 of member 158; and a pair of elongated arms 186 pivotally mounted at their ends on tracks 74 near the middle of the third chamber on shoulder screws 188 engaged in the tracks. Arms 186 include rearwardly projecting tracks 190 so formed as, in the operative position of panel 178 (shown in broken lines) to function as extensions of tracks 74 for supporting the image-recording sheet in position for exposure and guiding it from the third chamber into the second chamber into superposition with the image-receiving sheet. Panel 178 is pivotable into the open position shown, to permit loading of a roll of image-receiving sheet into chamber 96 and is pivoted from its open to its closed position by engagement with inner panel 72 during pivotal movement of the rear housing section from its open to its closed position. The first and second sections of member 158 and panel 178 are provided with ribs 192 curved to conform to the periphery of a coil of the image-receiving sheet to properly position the coil within chamber 96 and permit uncoiling of the image-receiving sheet.

In the operation of the camera, successive portions of the image-recording sheet are positioned for exposure and, following exposure, are advanced into superposition with the image-receiving sheet between rolls 104 and 106 from the camera. An indexing mechanism is provided for controlling the movement of the sheets through the apparatus so as to locate successive portions of the image-receiving sheet in position for exposure; and these means include a disc 194 having radial projections 196 mounted coaxially with roll 104 on one of shafts 110 at an end of medial portion 108 of the roll. Disc 194 is rotatable with respect to the roll and is biased into frictional engagement with the end of medial portion 108 by a coil spring 198 engaged around shaft 110 between the disc and the end of a cup 200 disposed around spring 198 between disc 194 and a side member 102 of frame 98. Cup 200 is provided around spring 198 to help prevent the admission of light through opening 92 into the camera housing past the end of the medial portion of roll 104, and has an outer diameter approximately equal to the diameter of the medial portion of roll 104. The medial portion of roll 106 is provided near one end thereof with a peripheral groove 202 for accommodating radial projections 196 to allow for rotation of both rolls and disc 194.

The image-receiving sheet is provided along one edge with a succession of openings 204, each opening being associated with a portion of the image-receiving sheet adapted to be superposed with an exposed portion of the image-recording sheet to effect the processing of the sheets. Openings 204 in the image-receiving sheet are aligned with disc 194 during movement of the sheets between the rolls and the frictional coupling between roll 104, and disc 194 is such that one of projections 196 rides against the outer surface of second sheet 94 until an opening 204 in the sheet becomes aligned with the projection and the projection enters the opening punching a hole in the underlying portion of sheet 82. Movement of the sheets is arrested by preventing rotation of disc 194 with a projection 196 engaged in an opening 204 in sheet 94 and hole in sheet 82; and means are provided for releasably engaging the projections to prevent rotation of the disc and arrest movement of the sheets. These means comprise an engagement member 206 mounted for limited pivotal movement on an elongated bar 208 pivotally mounted at its ends on side members 102 of frame 98. Bar 208 comprises a generally flat plate having ears 210 extending from its ends and pivotally engaged holes 212 in side members 102 of frame 98; and is pivotable about ears 210 between a closed position in which the bar is located closely adjacent roll 104 to an open position in which the bar projects through opening 92 from the camera housing. Engagement member 206 includes an L-shaped end section 214 pivotally engaged in a slot 216 in bar 208 and an engagement section 218 formed with a slot 220 in which radial projections 196 are engaged to prevent rotation of the disc in the open position of bar 208, shown in FIG. 3. In the closed position of the bar, shown in FIG. 2, engagement section 218 of member 206 is located out of the path of rotation of projections 196 so that disc 194 is free to rotate and permit movement of the sheets between rolls 104 and 106.

Bar 208 includes a longitudinal edge 222 disposed closely adjacent the bite of the rolls in the closed position of the bar and sharpened to provide means against which the sandwich comprising the superposed sheets may be drawn for tearing the sandwich in the open position of the bar. By virtue of this construction, to operate the camera, bar 208 is pivoted into its closed position so that edge 222 bears against a portion of the sandwich located adjacent the rolls and projecting through opening 92, to provide a leader by which the sandwich may be grasped manually for advancing the sheets through the apparatus. In this closed position of the bar at the commencement of a processing cycle of the apparatus, a projection 196 extends through an opening 204 in sheet 94 and also through sheet 82 and engagement section 218 of member 206 is located out of the path of movement of the radial projections. The ends of the sandwich extending beyond the rolls and bar through opening 92 are grasped and pulled, simultaneously rotating disc 194 until a projection 196, not engaged with the sheet, is past engagement section 218 and pivoting bar 208 into its open position thereby pivoting engagement member 206 into position to engage the projection 196 previously engaged with the sheets. Disc 194 rotates until a projection (previously engaged by member 206) bears against sheet 94 and rides against the surface of the sheet until an opening 204 comes into alignment with the projection, thereby rotating disc 194 until the other projection is engaged by member 206 arresting rotation of the disc with a projection 196 extending through opening 204 and sheet 82 into groove 202 in roll 106. At this point, movement of the sheets is arrested with an area of the image-recording sheet located in position for exposure and the sandwich, including the previously exposed area of the image-recording sheet, is drawn against edge 222 of bar 208 to sever the sandwich along a predetermined transverse line, leaving a leader which may be grasped for advancing the sheets through the apparatus to effect another processing cycle.

A leaf spring 224 is provide mounted on transverse member 100 of frame 98 with its end in engagement with a curved portion 221 of the inner edge of bar 208 opposite edge 222 for releasably retaining the bar in both its open and closed positions while permitting pivotal movement of the bar from its closed to its open position in response to frictional engagement of edge 222 with sheet 94. A manually engageable button 226 is mounted on bar 208 to provide means which may be engaged for manually pivoting bar 208 into its open position, and moving engagement member 206 out of position to engage a projection 196 and arrest rotation of disc 194. Button 226 is needed in case the operation should inadvertently close bar 208 before tearing the sandwich and is constructed so that bar 208 can be pivoted past center with respect to leaf spring 224 allowing the bar to move into its open position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A camera means comprising, in combination:
a housing including forward and rear sections joined to one another for movement with respect to one another between open and closed positions;
said forward housing section including forward, side, end and intermediate walls defining a first recess at one end of said housing open at the rear for receiving and holding a coil of a photosensitive sheet and a second recess open at the rear and separated from said first recess by said intermediate wall, said second recess including a first portion substantially deeper than said first recess adjacent said intermediate wall and a second portion shallower than said first portion located to the side thereof opposite said first recess for holding a coil of a second sheet;
exposure means mounted on said forward housing section at the forward end of said first portion of said second recess;
guide means mounted on said forward housing section at the rear of said first portion of said second recess for engaging the lateral edges of a section of said photosensitive sheet to support said section of said photosensitive sheet in position for exposure to light transmitted by said exposure means through said first portion of said second recess;
said rear housing section cooperating with said forward housing section in the closed position of said housing sections to define first and second chambers separated by said intermediate wall and a passage between said chambers at the rear of said intermediate wall for allowing movement of said photosensitive sheet from said first chamber into exposure position within said second chamber;
means on said rear housing section for supporting said photosensitive sheet against said guide means in position for exposure in the closed position of said housing sections;
said housing sections including portions cooperating in said closed position to define an opening in the rear of said housing communicating with said second portion of said second recess and through which said photosensitive sheet and said second sheet can be withdrawn in superposition from said housing; and
means mounted on said forward housing section for movement with respect to said forward housing section between operative and inoperative positions, the last-mentioned means including means cooperating with said housing sections for holding said last-mentioned means in said operative position thereof when said housing sections are in said closed position and being movable into said operative position when said housing sections are in said open position;
said last-mentioned means in said operative position cooperating with said housing sections to divide said second chamber into first and second subchambers comprising, respectively, said first and second portions of said second recess and joined by a passage through which said photosensitive sheet is movable from exposure position within said first subchamber into superposition with said second sheet within said second subchamber;

said last-mentioned means being constructed, when in said operative position, to retain said coil of said second sheet within said second subchamber and prevent admission of light into said first subchamber from said second subchamber and, when in said inoperative position, to permit loading of a coil of said second sheet into said second portion of said second recess.

2. The camera of claim 1 in which said last-mentioned means include means for engaging said rear housing section during movement of said rear housing section relative to said forward housing section from said open to said closed position to move said last-mentioned means from said inoperative to said operative position.

3. The camera of claim 1 in which said last-mentioned means include guide members which, in said operative position of said last-mentioned means, extend from said first subchamber into said second subchamber at the rear of said subchambers in position for engaging said lateral edges of said photosensitive sheet to locate said photosensitive sheet in position for exposure and guide said photosensitive sheet into superposition with said second sheet.

4. A camera comprising in combination:
a housing including forward and rear housing sections joined to one another for movement with respect to one another between open and closed positions;
said housing sections including portions defining a first chamber for holding a supply of a photosensitive sheet, a second chamber for holding a supply of a second sheet, a third chamber between said first and second chambers and an opening from the outside of said housing into said second chamber through which said photosensitive and second sheets can be withdrawn in superposition from said camera;
guide means mounted on said housing sections for supporting and locating successive sections of said photosensitive sheet in position for exposure at the rear of said third chamber;
exposure means mounted on said forward housing section for exposing a section of said pohotsensitive sheet located in position for exposure at the rear of said third chamber;
means mounted on said forward housing section for movement with respect to said forward housing section between operative and inoperative positions, the last-mentioned means being so constructed as, in said operative position, to separate said second and third chambers to prevent light admitted through said opening from exposing said photosensitive sheet within said third chamber, engage and support said section of said photosensitive sheet in position for exposure and guide said photosensitive sheet from said third chamber into superposition with said second sheet in said second chamber, said last-mentioned means in said inoperative position permitting loading of a coil of said second sheet into said second chamber;
said guide means including a pair of tracks extending from said first chamber partway across the rear of said third chamber for engaging and supporting the lateral edges of said photosensitive sheet;
said last-mentioned means including members which, in said operative position, form extensions of said tracks extending from the ends thereof into said second chamber.

5. A camera comprising in combination:
a housing including forward and rear housing sections joined to one another for movement with respect to one another between open and closed positions;
said housing sections including portions defining a first chamber for holding a supply of a photosensitive sheet, a second chamber for holding a supply of a second sheet, a third chamber between said first and second chambers and an opening from the outside of housing into said second chamber through which said photosensitive and second sheets can be withdrawn in superposition from said camera;
guide means mounted on said housing sections for supporting and locating successive sections of said photosensitive sheet in position for exposure at the rear of said third chamber;
exposure means mounted on said forward housing section for exposing a section of said photosensitive sheet located in position for exposure at the rear of said third chamber;
means mounted on said forward housing section for movement with respect to said forward housing section between operative and inoperative positions, the last-mentioned means being so constructed as, in said operative position, to separate said second and third chambers to prevent light admitted through said opening from exposing said photosensitive sheet within said third chamber, engage and support said section of said photosensitive sheet in position for exposure and guide said photosensitive sheet from said third chamber into superposition with said second sheet in said second chamber, said last-mentioned means in said inoperative position permitting loading of a coil of said second sheet into said second chamber; and
means including a cam mounted on said rear housing section and means mounted on said forward housing section in the path of movement of said cam for engagement thereby during movement of said rear housing section into closed position, to move said last-mentioned means into said operative position thereof.

References Cited by the Examiner

UNITED STATES PATENTS 2,455,111  11/1948  Carbone _____ 95—13
2,681,602   6/1954  Fairbands _____ 94—13

JOHN M. HORAN, *Primary Examiner.*